(12) United States Patent
Hu et al.

(10) Patent No.: US 11,822,184 B2
(45) Date of Patent: Nov. 21, 2023

(54) BACKLIGHT MODULE, DISPLAY DEVICE STRUCTURE AND DISPLAY DEVICE

(71) Applicants: CHONGQING HKC OPTOELECTRONICS TECHNOLOGY CO., LTD., Chongqing (CN); HKC CORPORATION LIMITED, Shenzhen (CN)

(72) Inventors: Xiaogang Hu, Chongqing (CN); Rongrong Li, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/063,830

(22) Filed: Dec. 9, 2022

(65) Prior Publication Data
US 2023/0205003 A1    Jun. 29, 2023

(30) Foreign Application Priority Data

Dec. 27, 2021 (CN) .......................... 202111616069.3

(51) Int. Cl.
*G02F 1/13357* (2006.01)
*G02F 1/1333* (2006.01)

(52) U.S. Cl.
CPC .... *G02F 1/133606* (2013.01); *G02F 1/13332* (2021.01); *G02F 1/13338* (2013.01); *G02F 1/133608* (2013.01)

(58) Field of Classification Search
CPC ............. G02F 1/13332; G02F 1/13338; G02F 1/133608
See application file for complete search history.

(56) References Cited

U.S. PATENT DOCUMENTS

| | | | |
|---|---|---|---|
| 2013/0021727 A1* | 1/2013 | Lo | H04N 13/31 361/679.01 |
| 2013/0208209 A1* | 8/2013 | Zhou | G02F 1/133308 349/58 |
| 2018/0261168 A1* | 9/2018 | Mori | G02F 1/136259 |

FOREIGN PATENT DOCUMENTS

| | | | |
|---|---|---|---|
| CN | 107358875 A | 11/2017 | |
| CN | 208766421 U | 4/2019 | |
| CN | 111830748 A * | 10/2020 | ....... G02F 1/133603 |
| CN | 111830748 A | 10/2020 | |

(Continued)

OTHER PUBLICATIONS

First Office Action issued in counterpart Chinese Patent Applicaiton No. 202111616069.3, dated Sep. 19, 2022.

*Primary Examiner* — Karabi Guharay
(74) *Attorney, Agent, or Firm* — Westbridge IP LLC (57) ABSTRACT

Disclosed are a backlight module, a display device structure and a display device. The backlight module includes a light source plate and an optical film sequentially arranged. The backlight module further includes a light-transmitting magnetic structure provided between the light source plate and the optical film. A magnetic support force from the light source plate towards the optical film is formed in the light-transmitting magnetic structure, the light-transmitting magnetic structure is partially formed on the optical film, and the magnetic support force is configured to support the optical film.

13 Claims, 5 Drawing Sheets

(56) References Cited

FOREIGN PATENT DOCUMENTS

| EP | 2725410 A1 * | 4/2014 | ........... G02F 1/1333 |
|----|--------------|--------|--------------------------|
| JP | 2000012663 A | 1/2000 | |
| KR | 20090023058 A | 3/2009 | |

* cited by examiner

BACKLIGHT MODULE, DISPLAY DEVICE STRUCTURE AND DISPLAY DEVICE

CROSS-REFERENCE TO RELATED APPLICATIONS

This application claims priority to Chinese Patent Application No. 202111616069.3, filed on Dec. 27, 2021, the entire contents of which are incorporated herein by reference.

TECHNICAL FIELD

The present disclosure relates to the technical field of display devices, and in particular to a backlight module, a display device structure and a display device.

BACKGROUND

The existing mini light emitting diode (LED) and micro LED belong to liquid crystal display (LCD) backlight technique, which improves the ability to control the backlight area and reduces the optical distance of backlight, only through the introduction of packaging, size miniaturization and massive transfer technique, so as to realize the backlight technique with ultra-thin and high-dynamic contrast. The introduction of the mini LED backlight technique will be helpful to break through the limitations of the LCD, weaken the advantages of self-lighting technique, and further widen the cost-performance gap between the LCD and the alternative technique. Compared with organic light emitting diode (OLED), the mini LED has a higher dynamic range, a better contrast, a longer life, and a quicker response rate of the screen. The mini LED will be the future trend and development direction. In the existing display module, a support column is generally provided between the backplane and the optical film to provide enough light mixing distance for the light source disposed on the backplane. However, the backlight source in the mini LED is mostly spliced by multiple light plates. As a result, it is difficult to place the support column, which makes the assembly process of Mini LED more complicated and the production efficiency lower.

SUMMARY

The main objective of the present disclosure is to provide a backlight module, a display device structure and a display device, which aims to solve the problems of complicated assembly process and low production efficiency of the existing display device due to the difficulty in placing the support column.

In order to achieve the above objective, the present disclosure provides a backlight module, including: a light source plate and an optical film sequentially arranged; and a light-transmitting magnetic structure provided between the light source plate and the optical film. A magnetic support force from the light source plate towards the optical film is formed in the light-transmitting magnetic structure, the light-transmitting magnetic structure is partially formed on the optical film, and the magnetic support force is configured to support the optical film.

In an embodiment, the light-transmitting magnetic structure includes a first repulsive magnetic portion and a second repulsive magnetic portion, and a magnetic polarity of the first repulsive magnetic portion is identical to a magnetic polarity of the second repulsive magnetic portion In an embodiment, the first repulsive magnetic portion includes the optical film made of magnetic material, or the first repulsive magnetic portion is provided on the optical film.

In an embodiment, the second repulsive magnetic portion includes the light source plate made of magnetic material, or the second repulsive magnetic portion is provided on the light source plate.

In an embodiment, the light source plate includes a light source plate body and a sealant coating provided on a side of the light source plate body towards the optical film; and the second repulsive magnetic portion includes the sealant coating made of magnetic material, or the second repulsive magnetic portion is provided on the sealant coating.

In an embodiment, the first repulsive magnetic portion includes a second light-transmitting magnetic coating provided on the optical film.

In an embodiment, the second repulsive magnetic portion includes a third light-transmitting magnetic coating provided on the light source plate.

The present disclosure also provides a display device structure, including: a backlight module including a light source plate and an optical film sequentially arranged; a display panel provided on a side of the optical film away from the light source plate; and two first attraction magnetic portions respectively provided on the optical film and the display panel, magnetic polarities of the two first attraction magnetic portions being opposite.

In an embodiment, a first repulsive magnetic portion is provided on the optical film of the backlight module, and one of the two first attraction magnetic portions provided on the optical film includes the first repulsive magnetic portion.

In an embodiment, one of the two first attraction magnetic portions includes a magnetic optical adhesive layer, and another of the two first attraction magnetic portions includes a first light-transmitting magnetic coating.

In an embodiment, the display panel is a laminated screen, including a display layer and a dimming layer sequentially arranged, the display layer is provided on a side of the optical film away from the light source plate, and the dimming layer is provided between the display layer and the optical film.

The present disclosure further provides a display device, including: a backlight module, including: a light source plate and an optical film sequentially arranged; a light-transmitting magnetic structure provided between the light source plate and the optical film; and a backplane provided on a side of the light source plate of the backlight module away from the optical film of the backlight module; a rubber frame provided on a side end of the backplane; and a support film extending laterally, an outer end of the support film is connected to an inner side of the rubber frame, and an inner end of the support film is located between the optical film and the light source plate, for connecting with the optical film.

In an embodiment, an adsorption magnetic structure is formed in the display device; the adsorption magnetic structure includes two second attraction magnetic portions, magnetic polarities of the two second attraction magnetic portions are opposite; one of the two second attraction magnetic portions is provided on the support film; and another of the two second attraction magnetic portions is provided on the optical film, or another of the two second attraction magnetic portions includes the optical film made of magnetic material.

In an embodiment, the display device further includes a touch module provided on a side of a display panel away from the optical film.

In an embodiment, the display device further includes a front frame provided around a periphery of the rubber frame, to clamp the rubber frame.

In technical solutions of the present disclosure, the backlight module includes a light source plate and an optical film that are arranged in sequence. The light-transmitting magnetic structure is provided in the backlight module. A magnetic support force from the light source plate towards the optical film is formed in the light-transmitting magnetic structure. Since the light-transmitting magnetic structure is partially formed on the optical film, the magnetic support force can support the optical film. That is, the light-transmitting magnetic structure replaces the support column structure in the related art. Since the magnetic support force generated by the light-transmitting magnetic structure can support the optical film, the collapse of the optical film due to the lack of support by a support column between the light-transmitting magnetic structure and the light source plate can be avoided, thereby affecting the optical effect. In addition, the light mixing distance between the optical film and the light source plate is sufficient, thereby improving the visual effect and enhancing the user's visual experience. Furthermore, since the light-transmitting magnetic structure replaces the support column structure, the internal structure of the display device is simplified, the assembly process of the display device is simplified, and the production efficiency of the display device is improved.

BRIEF DESCRIPTION OF THE DRAWINGS

In order to more clearly illustrate the technical solutions in the embodiments of the present disclosure or in the related art, the following briefly introduces the accompanying drawings that need to be used in the description of the embodiments or the prior art. Obviously, the drawings in the following description are only some embodiments of the present disclosure. For those of ordinary skill in the art, other related drawings can also be obtained from these drawings without any creative effort.

The purpose, functional characteristics and advantages of the present disclosure will be combined with the embodiment, referring to the attached drawings for further explanation.

DETAILED DESCRIPTION OF THE EMBODIMENTS

To make the purposes, technical solutions and advantages of the embodiments of the present disclosure more clear, the technical solutions in the embodiments of the present disclosure will be described clearly and completely below. If the specific conditions are not indicated in the examples, it is carried out according to the conventional conditions or the conditions suggested by the manufacturer. The used reagents or instruments without the manufacturer's indication are conventional products that can be purchased from the market.

In addition, the meaning of "and/or" in the whole present disclosure includes three parallel schemes, take "A and/or B" for example, including A scheme, or B scheme, or A and B both meet the scheme. Besides, the technical solutions of various embodiments can be combined with each other, but only on the basis that they can be realized by ordinary technicians in the field. In the occasion where the combination of technical solutions is contradictory or impossible to realize, such combination of technical solutions shall be considered as non-existent and out of the scope of this disclosure. Based on the embodiments of the present disclosure, all other embodiments obtained by those of ordinary in the art without creative labor fall within the scope of the present disclosure.

Figure 1:
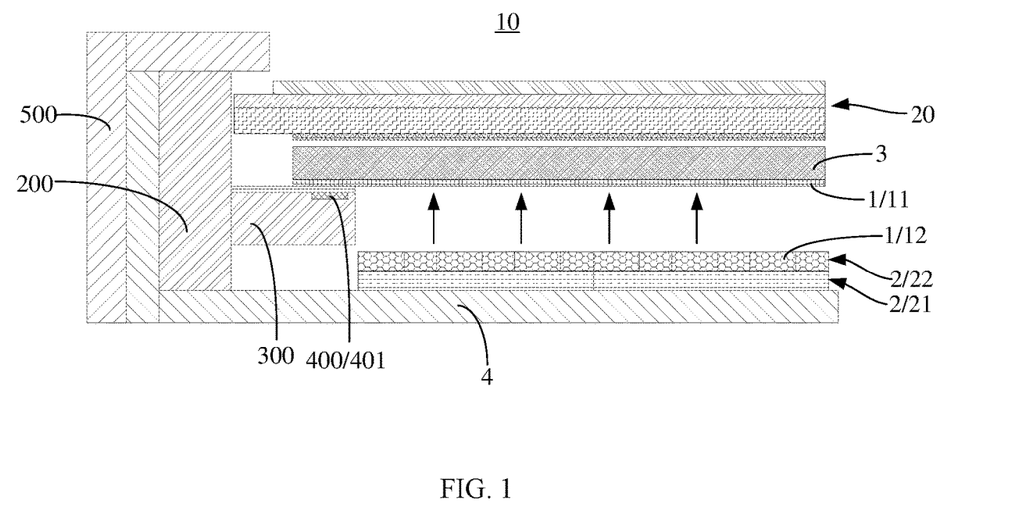
FIG. 1 is a schematic structural diagram of a backlight module according to a first embodiment of the present disclosure.

Referring to FIG. 1, in the first embodiment, the light-transmitting magnetic structure 1 includes a first repulsive magnetic portion 11 and a second repulsive magnetic portion 12. A magnetic polarity of the first repulsive magnetic portion 11 is identical to a magnetic polarity of the second repulsive magnetic portion 12. The first repulsive magnetic portion 11 is provided on the optical film 3, and the second repulsive magnetic portion 12 is provided on the light source plate 2. Since the magnetic polarity of the first repulsive magnetic portion 11 is identical to the magnetic polarity of the second repulsive magnetic portion 12, a repulsive force is formed between the first repulsive magnetic portion 11 and the second repulsive magnetic portion 12, forming a magnetic support force between the optical film 3 and the light source plate 2, which avoids the collapse of the optical film 3 due to the lack of support by the support column between the optical film 3 and the light source plate 2, thereby affecting the optical effect. After the optical film 3 is supported, a sufficient light mixing distance can be formed between the optical film 3 and the light source plate 2, so as to improve the visual effect and enhance the user's visual experience.

In an embodiment, the first repulsive magnetic portion 11 includes a first light-transmitting magnetic coating provided on the optical film 3. Because the first light-transmitting magnetic coating is magnetic and transparent, it can not only play a role as the first repulsive magnetic portion 11 to form the magnetic support force between the optical film 3 and light source plate 2, but also does not interfere with the transmission of light.

In an embodiment, the light source plate 2 includes a light source plate body 21 and a sealant coating 22 provided on a side of the light source plate body 21 towards the optical film 3. The second repulsive magnetic portion 12 includes the sealant coating 22 provided with magnetic materials, and the sealant coating 22 becomes magnetic to form the second repulsive magnetic portion 12. In this way, not only the magnetic support between the light source plate 2 and the optical film 3 is guaranteed, but also the structure of the backlight module 10 is simplified, so as to simplify the installation process and improve the production efficiency of the backlight module 10.

It should be noted that the magnetic material is light-transmitting, so that there will be no interference with the transmission of light, so as to avoid the reduction of light penetration resulting from the magnetic optical adhesive layer and the first light-transmitting magnetic coating, and then avoid the abnormal image displayed on the display panel 20.

Figure 2:
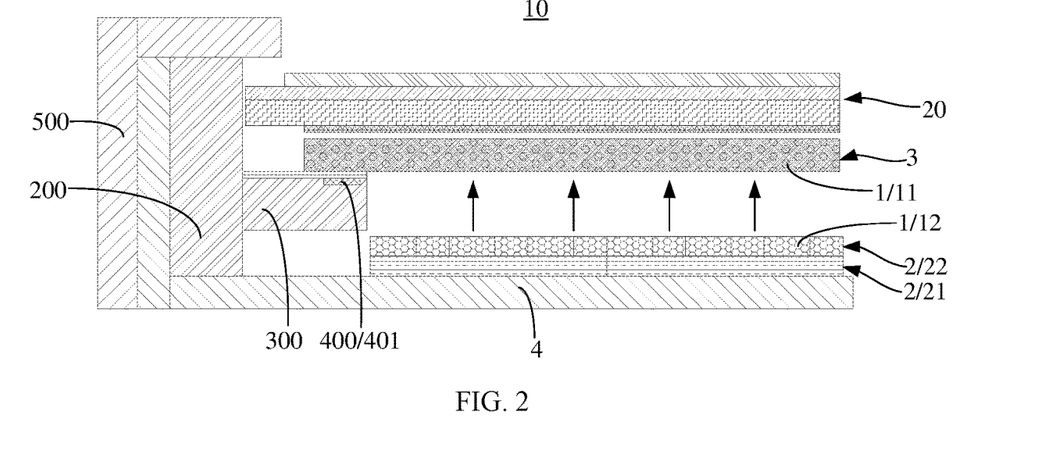
FIG. 2 is a schematic structural diagram of a backlight module according to a second embodiment of the present disclosure.

Referring to FIG. 2, in the second embodiment, the light-transmitting magnetic structure 1 includes the first repulsive magnetic portion 11 and the second repulsive magnetic portion 12. The magnetic polarity of the first repulsive magnetic portion 11 is identical to the magnetic polarity of the second repulsive magnetic portion 12. The first repulsive magnetic portion 11 includes the optical film 3 equipped with magnetic materials and the second repulsive magnetic portion 12 includes the light source plate 2 equipped with magnetic materials. Since the magnetic polarity of the first repulsive magnetic portion 11 is identical to the magnetic polarity of the second repulsive magnetic portion 12, a repulsive force is formed between the first repulsive magnetic portion 11 and the second repulsive magnetic portion 12, forming a magnetic support force between the optical film 3 and the light source plate 2, which avoids the collapse of the optical film 3 due to the lack of support by the support column between the optical film 3 and the light source plate 2, thereby affecting the optical effect. After the optical film 3 is supported, a sufficient light mixing distance can be formed between the optical film 3 and the light source plate 2, so as to improve the visual effect and enhance the user's visual experience.

It should be noted that the optical film 3 becomes magnetic to form the first repulsive magnetic portion 11. In this way, not only the magnetic support between the light source plate 2 and the optical film 3 is guaranteed, but also the structure of the backlight module 10 is simplified, so as to simplify the installation process and improve the production efficiency of the backlight module 10.

In an embodiment, the light source plate 2 includes a light source plate body 21 and a sealant coating provided on a side of the light source plate body 21 towards the optical film 3. The second repulsive magnetic portion 12 includes the sealant coating 22 provided with magnetic materials, and the sealant coating 22 becomes magnetic to form the second repulsive magnetic portion 12. In this way, not only the magnetic support between the light source plate 2 and the optical film 3 is guaranteed, but also the structure of the backlight module 10 is simplified, so as to simplify the installation process and improve the production efficiency of the backlight module 10.

It should be noted that the magnetic material is light-transmitting, so that there will be no interference with the transmission of light, so as to avoid the reduction of light penetration resulting from the magnetic optical adhesive layer and the first light-transmitting magnetic coating, and then avoid the abnormal image displayed on the display panel.

Figure 3:
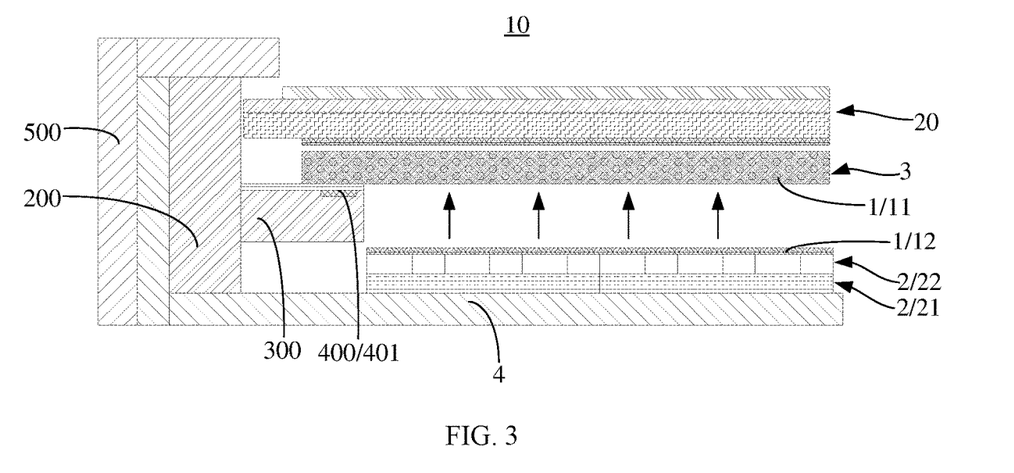
FIG. 3 is a schematic structural diagram of a backlight module according to a third embodiment of the present disclosure.

Referring to FIG. 3, in the third embodiment, the light-transmitting magnetic structure 1 includes the first repulsive magnetic portion 11 and the second repulsive magnetic portion 12. The magnetic polarity of the first repulsive magnetic portion 11 is identical to the magnetic polarity of the second repulsive magnetic portion 12. The first repulsive magnetic portion 11 includes the optical film 3 equipped with magnetic materials and the second repulsive magnetic portion 12 is provided on the light source plate 2. Since the magnetic polarity of the first repulsive magnetic portion 11 is identical to the magnetic polarity of the second repulsive magnetic portion 12, a repulsive force is formed between the first repulsive magnetic portion 11 and the second repulsive magnetic portion 12, forming a magnetic support force between the optical film 3 and the light source plate 2, which avoids the collapse of the optical film 3 due to the lack of support by the support column between the optical film 3 and the light source plate 2, thereby affecting the optical effect. After the optical film 3 is supported, a sufficient light mixing distance can be formed between the optical film 3 and the light source plate 2, so as to improve the visual effect and enhance the user's visual experience.

It should be noted that the optical film 3 becomes magnetic to form the first repulsive magnetic portion 11. In this way, not only the magnetic support between the light source plate 2 and the optical film 3 is guaranteed, but also the structure of the backlight module 10 is simplified, so as to simplify the installation process and improve the production efficiency of the backlight module 10.

In an embodiment, the second repulsive magnetic portion 12 includes a second light-transmitting magnetic coating provided on the light source plate 2. The second light-transmitting magnetic coating is provided on the side of the light source plate 2 towards the optical film 3. Because the second light-transmitting magnetic coating is magnetic and transparent, it can not only play a role as the second repulsive magnetic portion 12 to form the magnetic support force between the optical film 3 and light source plate 2, but also does not interfere with the transmission of light.

Furthermore, the light source plate 2 includes a light source plate body 21 and a sealant coating 22 provided on a side of the light source plate body 21 towards the optical film 3. A third light-transmitting magnetic coating is provided on the side of the sealant coating 22 towards the optical film 3.

It should be noted that in other embodiments of the present disclosure, the first repulsive magnetic portion 11 includes a first light-transmitting magnetic coating provided on the optical film 3. Because the first light-transmitting magnetic coating is magnetic and transparent, it can not only play a role as the first repulsive magnetic portion 11 to form the magnetic support force between the optical film 3 and light source plate 2, but also does not interfere with the transmission of light.

Correspondingly, the second repulsive magnetic portion 12 includes a second light-transmitting magnetic coating provided on the light source plate 2. The second light-transmitting magnetic coating is provided on the side of the light source plate 2 towards the optical film 3. Because the second light-transmitting magnetic coating is magnetic and transparent, it can not only play a role as the second repulsive magnetic portion 12 to form the magnetic support force between the optical film 3 and light source plate 2, but also does not interfere with the transmission of light.

Figure 4:
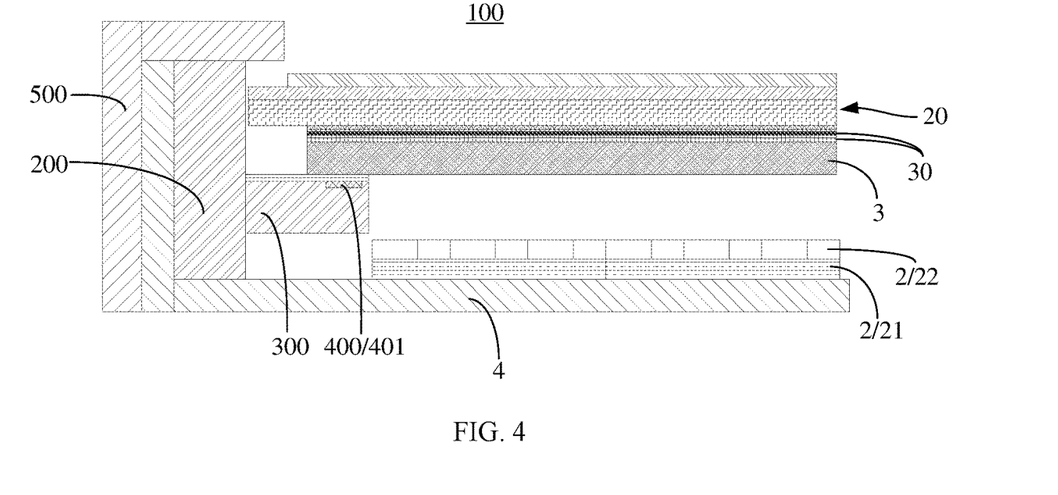
FIG. 4 is a schematic structural diagram of a display device structure according to an embodiment of the present disclosure.

The present disclosure further provides a display device structure 100, referring to FIG. 4, the display device structure 100 includes a backlight module 10, a display panel 20 and two first attraction magnetic portions 30. The backlight module 10 includes a light source plate 2 and an optical film 3 sequentially arranged. The display panel 20 is provided on a side of the optical film 3 away from the light source plate 2. The two first attraction magnetic portions 30 are respectively provided on the optical film 3 and the display panel 20. The magnetic polarities of the two first attraction magnetic portions 30 are opposite. In an embodiment, two first attraction magnetic portions 30 are respectively provided on the optical film 3 and the display panel 20. Because the magnetic polarities of the two first attraction magnetic portions 30 are opposite, an adsorption force is formed between the two first attraction magnetic portions 30, forming a magnetic support force between the optical film 3 and the light source plate 2, which avoids the collapse of the optical film 3 due to the lack of support by the support column between the optical film 3 and the light source plate 2, thereby affecting the optical effect. After the optical film 3 is supported, a sufficient light mixing distance can be formed between the optical film 3 and the light source plate 2, so as to improve the visual effect and enhance the user's visual experience.

It should be noted that in other embodiments of the present disclosure, the backlight module 10 is the backlight module 10 mentioned above, that is, the display device structure 100 includes the above-mentioned backlight module 10, and has all the technical features of all the embodiments, and all the technical effects followed, which will not be repeated herein.

Further, based on the embodiment that the backlight module 10 is the backlight module 10 mentioned above, a first repulsive magnetic portion 11 is provided on the optical film 3 of the backlight module 10. The first attraction magnetic portion 30 provided on the optical film 3 includes the first repulsive magnetic portion 11, that is, in the backlight module 10, the first repulsive magnetic portion 11 is provided on the optical film 3. It is only necessary to provide another first attraction magnetic portion 30 on the display panel 20 to treat the first repulsive magnetic portion 11 as the first attraction magnetic portion 30. In this way, under the premise that the function of supporting the optical film 3 is realized, simplifying the structure on the optical film 3 can reduce the use of materials and save costs.

In an embodiment, one of the two first attraction magnetic portions 30 includes a magnetic optical adhesive layer, which can not only be used as the first attraction magnetic portion 30 to form magnetic support force between the optical film 3 and the light source plate 2, but also can form adhesion force between the optical film 3 and the light source plate 2. In this way, not only the installation of the optical film 3 becomes stronger, but also the optical film 3 is supported. Therefore, a sufficient light mixing distance can be formed between the optical film 3 and the light source plate 2.

Further, another of the two first attraction magnetic portions 30 includes a first light-transmitting magnetic coating. Because the first light-transmitting magnetic coating is magnetic and transparent, it can not only play a role as the first attraction magnetic portion 30 to form the magnetic support force between the optical film 3 and light source plate 2, but also does not interfere with the transmission of light.

It should be noted that the two technical features can be alternatively provided or be simultaneously provided. In an embodiment, the two features are simultaneously provided, that is, one of the two first attraction magnetic portions 30 includes the magnetic optical adhesive layer, and another of the two first attraction magnetic portions 30 includes the first light-transmitting magnetic coating. The magnetic polarity of the magnetic optical adhesive layer is opposite to the magnetic polarity of the first light-transmitting magnetic coating, a magnetic support force can be formed between the optical film 3 and the light source plate 2, and an adhesion force can also be formed between the optical film 3 and the light source plate 2. In this way, not only the installation of the optical film 3 becomes stronger, but also the optical film 3 is supported. Therefore, a sufficient light mixing distance can be formed between the optical film 3 and the light source plate 2.

The present disclosure does not restrict the specific installation place of the first light-transmitting magnetic coating. The magnetic optical adhesive layer can be provided on one side of the optical film 3 towards the display panel 20. Correspondingly, the first light-transmitting magnetic coating can be provided on one side of the display panel 20 towards the optical film 3. In an embodiment, the magnetic optical adhesive layer can be provided on one side of the display panel 20 towards the optical film 3. Correspondingly, the first light-transmitting magnetic coating can be provided on one side of the optical film 3 toward the display panel 20. Because the magnetic optical adhesive layer can be directly coated on the display panel 20, the magnetic optical adhesive layer is provided on one side of the display panel 20 towards the optical film 3, which can simplify the installation process and improve the assembly efficiency of the display device 100.

It should be noted that in an embodiment, both the magnetic optical adhesive layer and the first light-transmitting magnetic coating are made of transparent magnetic materials. The use of the transparent magnetic materials can ensure that the magnetic support force is generated between the optical film 3 and the light source plate 2, so that there will be no interference with the transmission of light. Therefore, the decrease of the transmittance of light caused by the magnetic optical adhesive layer and the first light-transmitting magnetic coating is avoided, and then the abnormal image displayed on the display device 100 is avoided.

It should be noted that in the present disclosure, the materials of the light-transmitting magnetic structure 1 are not limited, which include at least one of electrical steel, ferrite, nickel base alloy or rare earth alloy.

It should be noted that in the present disclosure, the specific form of the optical film 3 is not limited, which includes at least one of a diffusion plate, a light guide plate and a brightening film.

Similarly, in the present disclosure, the specific form of the display panel 20 is not limited. The display panel 20 can be a single screen or a laminated screen. Users can choose different types of the display panel 20 according to specific product models and functions, so as to improve the applicability of the display device structure 100.

In some embodiments, the display panel 20 is a laminated screen, that is, the display panel 20 includes a display layer and a dimming layer. The display layer is provided on one side of the optical film 3 away from the light source plate 2. The dimming layer is provided between the display layer and the optical film 3. The display layer is focused on accurately controlling colors and faithfully renewing colors. The dimming layer is focused on exquisitely adjusting the lights and performing high contrast and dark field details, so that the key picture quality indicators such as peak brightness, gamut coverage and color accuracy of the display panel 20 are greatly improved, so as to equip the display device structure 100 with ultra-high resolution and the ability to show every tiny detail and bring realistic visual effects. The display device structure 100 is also equipped with a broader color space, so as to achieve a full range of color space expression and accurately express the rich color levels of nature.

Furthermore, based on the embodiment that the display panel 20 is a laminated screen, the two first attraction magnetic portions 30 are respectively provided on the dimming layer and the optical film 3. Since the magnetic polarities of the two first attraction magnetic portions 30 are opposite, an adsorption force is formed between the two first attraction magnetic portions 30, which can fix the optical film 3 to avoid affecting the optical effect due to the collapse of the optical film 3. After the optical film 3 is supported, a sufficient light mixing distance can be formed between the optical film 3 and the light source plate 2, so as to improve the visual effect and enhance the user's visual experience.

Referring to FIG. 1 to FIG. 4, in an embodiment, the display device 1000 further includes a backlight module 10, a rubber frame 200 and a support film 300. The backlight module 10 further includes a light source plate 2 provided on the backlight module 10, and a backplane 4 away from a side of the optical film 3 of the backlight module 10. The rubber frame 200 is provided on the side end of the backplane 4. The support film 300 extends laterally. The outer side of the support film 300 is connected with the inner side of the rubber frame 200. The inner side of the support film 300 is between the optical film 3 and the light source plate 2, to connect with the optical film 3. The optical film 3 is supported by the support film 300, such that the installation of the optical film 3 is more stable, so as to enhance the stability of the end of the optical film 3.

In some embodiments, the backlight module 10 is the backlight module 10 mentioned above, that is, the display device structure 100 includes the above-mentioned backlight module 10, and has all the technical features of all the embodiments, and all the technical effects followed, which will not be repeated herein.

Figure 5:
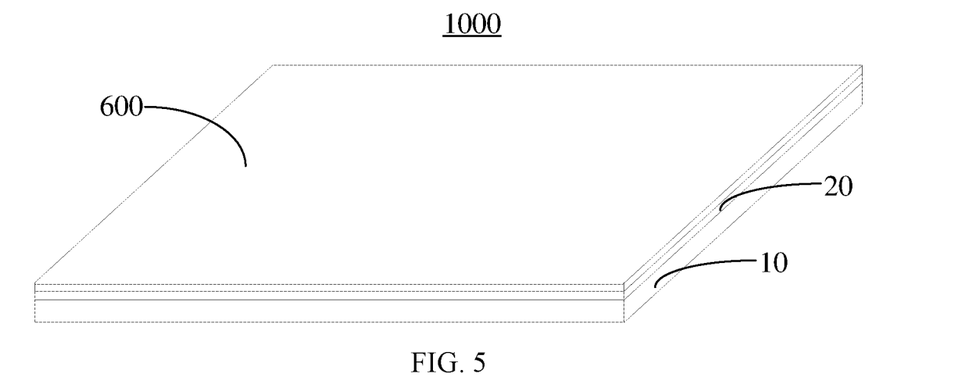
FIG. 5 is a schematic structural diagram of a display device of the present disclosure.

In some embodiments, an adsorption magnetic structure 400 is formed in the display device 1000. The adsorption magnetic structure 400 includes two second attraction magnetic portions 401. The magnetic polarities of the two second attraction magnetic portions 401 are opposite. One of the two second attraction magnetic portions 401 is provided on the support film 300, and another of the two second attraction magnetic portions 401 is provided on the optical film 3. The adsorption magnetic structure 400 is provided between the support film 300 and the optical film 3, such that the optical film 3 can be adsorbed on the support film 300, which not only makes the installation of the optical film 3 more stable, but also simplifies the adsorption magnetic structure 400 compared to other fixation structures. The fixation process of the optical film 3 and the support film 300 is simplified, and the assembly efficiency of the optical film 3 is improved.

It should be noted that both the first attraction magnetic portion 30 provided on the optical film 3 in the first embodiment and the first repulsive magnetic portion 11 provided on the optical film 3 in the second embodiment can be used as the second attraction magnetic portion 401. In this way, not only the magnetic support force can be formed between the optical film 3 and the light source plate 2, but also an adsorption force can be formed between the optical film 3 and the support film 300, simplifying the inner structure of the display device 1000.

In other embodiments, an adsorption magnetic structure 400 is further formed in the display device 1000. The adsorption magnetic structure 400 includes two second attraction magnetic portions 401. The magnetic polarities of the two second attraction magnetic portions 401 are opposite. One of the two second attraction magnetic portions 401 is provided on the support film 300, and another one of the two second attraction magnetic portions 401 includes the optical film 3 equipped with magnetic materials. The adsorption magnetic structure 400 is provided between the support film 300 and the optical film 3, such that the optical film 3 can be adsorbed on the support film 300, which not only makes the installation of the optical film 3 more stable, but also simplifies the adsorption magnetic structure 400 compared to other kinds of fixation structures. The fixation process of the optical film 3 and the support film 300 is simplified, and the assembly efficiency of the optical film 3 is improved.

It should be noted that the optical films 3 equipped with magnetic materials in the third embodiment and the fourth embodiment can be used as the second attraction magnetic portion 401. In this way, not only the magnetic support force can be formed between the optical film 3 and the light source plate 2, but also an adsorption force can be formed between the optical film 3 and the support film 300, simplifying the inner structure of the display device 1000.

In an embodiment, a magnetic bar is provided in the support film 300. The second attraction magnetic portion 401 includes the magnetic bar. The magnetic bar is wrapped inside the support film 300, making the installation between the support film 300 and the optical film 3 easier. Since the magnetic bar is provided inside the support film 300, the magnetic bar does not occupy too much space, further saving the installation space of the display device 1000, which makes the internal structure of the display device 1000 more compact.

In an embodiment, the display device 1000 further includes a front frame 500. The front frame 500 is provided around the periphery of the rubber frame 200, so as to clamp the rubber frame 200, making the structure of the display device 1000 more stable.

In an embodiment, referring to FIG. 5, the display device 1000 further includes a touch module 600. The touch module 600 is provided on one side of the display panel 20 away from the optical film 3, so as to equip the display device 1000 with touch function.

The above are only embodiments of the present disclosure, but the present disclosure is not limited to the embodiments. The present disclosure can be variously altered and changed. Without departing from the principles and spirit of the present disclosure, the various changes, modifications, substitutions and alteration made to the embodiments will still fall within the scope of the present disclosure.

What is claimed is:

1. A backlight module, comprising:
   a light source plate and an optical film sequentially arranged; and
   a light-transmitting magnetic structure provided between the light source plate and the optical film,
   wherein:
   a magnetic support force from the light source plate towards the optical film is formed in the light-transmitting magnetic structure, the light-transmitting magnetic structure is partially formed on the optical film, and the magnetic support force is configured to support the optical film,
   the light-transmitting magnetic structure comprises a first repulsive magnetic portion and a second repulsive magnetic portion, and a magnetic polarity of the first repulsive magnetic portion is identical to a magnetic polarity of the second repulsive magnetic portion, and
   the second repulsive magnetic portion comprises the light source plate made of magnetic material, and the light source plate comprises a sealant coating made of magnetic material.

2. The backlight module of claim 1, wherein the first repulsive magnetic portion comprises the optical film made of magnetic material, or the first repulsive magnetic portion is provided on the optical film.

3. The backlight module of claim 1, wherein:
   the light source plate comprises a light source plate body and the sealant coating provided on a side of the light source plate body towards the optical film.

4. The backlight module of claim 1, wherein the first repulsive magnetic portion comprises a second light-transmitting magnetic coating provided on the optical film.

5. The backlight module of claim 1, wherein the second repulsive magnetic portion comprises a third light-transmitting magnetic coating provided on the light source plate.

6. A display device structure, comprising:
a backlight module comprising a light source plate and an optical film sequentially arranged, and a light-transmitting magnetic structure provided between the light source plate and the optical film, wherein a magnetic support force from the light source plate towards the optical film is formed in the light-transmitting magnetic structure, the light-transmitting magnetic structure comprises a first repulsive magnetic portion and a second repulsive magnetic portion, a magnetic polarity of the first repulsive magnetic portion is identical to a magnetic polarity of the second repulsive magnetic portion, the second repulsive magnetic portion comprises the light source plate made of magnetic material, and the light source plate comprises a sealant coating made of magnetic material;
a display panel provided on a side of the optical film away from the light source plate; and
two first attraction magnetic portions respectively provided on the optical film and the display panel, magnetic polarities of the two first attraction magnetic portions being opposite.

7. The display device structure of claim 6, wherein the first repulsive magnetic portion is provided on the optical film of the backlight module, one of the two first attraction magnetic portions provided on the optical film comprises the first repulsive magnetic portion, and the light source plate comprises a light source plate body and the sealant coating provided on a side of the light source plate body towards the optical film.

8. The display device structure of claim 6, wherein one of the two first attraction magnetic portions comprises a magnetic optical adhesive layer, and another of the two first attraction magnetic portions comprises a first light-transmitting magnetic coating.

9. The display device structure of claim 6, wherein the display panel is a laminated screen, comprising a display layer, and the display layer is provided on a side of the optical film away from the light source plate.

10. A display device, comprising:
a backlight module, comprising:
a light source plate and an optical film sequentially arranged;
a light-transmitting magnetic structure provided between the light source plate and the optical film; and
a backplane provided on a side of the light source plate of the backlight module away from the optical film of the backlight module;
a rubber frame provided on a side end of the backplane; and
a support film extending laterally,
wherein:
an outer end of the support film is connected to an inner side of the rubber frame, and an inner end of the support film is located between the optical film and the light source plate, for connecting with the optical film,
a magnetic support force from the light source plate towards the optical film is formed in the light-transmitting magnetic structure,
the light-transmitting magnetic structure comprises a first repulsive magnetic portion and a second repulsive magnetic portion, and a magnetic polarity of the first repulsive magnetic portion is identical to a magnetic polarity of the second repulsive magnetic portion, and
the second repulsive magnetic portion comprises the light source plate made of magnetic material, and the light source plate comprises a sealant coating made of magnetic material.

11. The display device of claim 10, wherein:
an adsorption magnetic structure is formed in the display device;
the adsorption magnetic structure comprises two second attraction magnetic portions, magnetic polarities of the two second attraction magnetic portions are opposite;
one of the two second attraction magnetic portions is provided on the support film;
another of the two second attraction magnetic portions is provided on the optical film, or another of the two second attraction magnetic portions comprises the optical film made of magnetic material; and
the light source plate comprises a light source plate body and the sealant coating provided on a side of the light source plate body towards the optical film.

12. The display device of claim 10, further comprising:
a touch module provided on a side of a display panel away from the optical film.

13. The display device of claim 10, further comprising:
a front frame provided around a periphery of the rubber frame, to clamp the rubber frame.

\* \* \* \* \*